United States Patent Office.

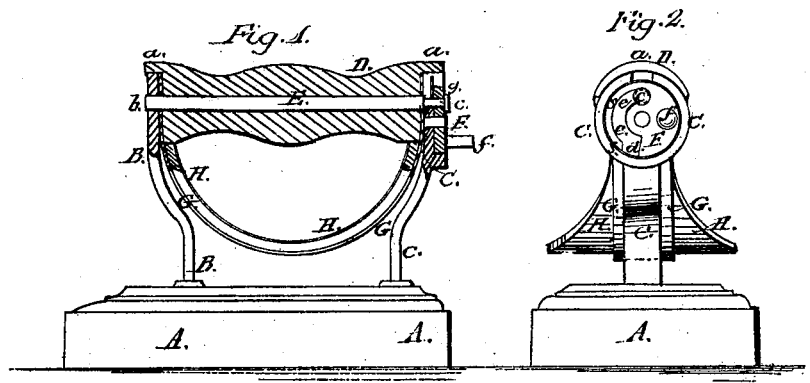

JULIE DITTRICH, OF HOBOKEN, NEW JERSEY.

Letters Patent No. 89,638, dated May 4, 1869.

IMPROVED SAD-IRON.

The Schedule referred to in these Letters Patent and making part of the same.

*To all whom it may concern:*

Be it known that I, JULIE DITTRICH, of the city of Hoboken, in the county of Hudson, and State of New Jersey, have invented a new and improved Sad-Iron; and I do hereby declare that the following is a full, clear, and exact description thereof, which will enable others skilled in the art to make and use the same, reference being had to the accompanying drawing forming part of this specification.

The object of this invention is to construct a sad-iron with a handle that can be readily removed, and with a shield by which the heat ascending from the iron is deflected away from the hand of the person using it.

The invention consists in a novel manner of constructing a removable handle on the supports that project from the iron, and also in a novel method of suspending the shield from the said removable handle.

In the accompanying drawing—

Figure 1 represents a vertical longitudinal section of the handle of a sad-iron;

Figure 2 is an end view of the same.

Similar letters of reference indicate corresponding parts.

A represents the body of the sad-iron, made of suitable form and construction.

From it project two handle-supports, B and C, of which one, B, has a round aperture in the upper part for the reception of the handle, while the other one, C, has a vertical slot for the same purpose.

D is the handle. It is made of wood, and has a metal pin, E, fitted lengthwise through it, the ends of said pin projecting from the ends of the handle, as shown in fig. 1.

The handle has projecting flanges $a$ $a$ at the ends for covering the upper ends of the supports B C, to prevent the heat of the same from ascending toward the hand.

The end $b$ of the pin E is fitted into the aperture of the part B, while the end $c$ of said pin is fitted into the slot of the support C.

The end $c$ is locked by means of a slotted plate, F, that is pivoted to the outer side of the support C. The slot of this plate is partly radial and straight, partly concentric and curved, as shown in fig. 2.

When the straight portion $d$ of this slot is in line with the slot of the support C, the pin $c$ can be inserted into it, and then the plate is turned so as to confine the pin in the concentric part $e$ of the slot, as in fig. 2.

The handle is now securely locked, and can be readily taken off by turning the plate F until the straight slots are again in line, for which purpose the said plate is provided with a handle, $f$, as shown.

The hook $g$, formed by the aforesaid slots, or their equivalents, on the plate F, locks the handle D which is released when the hook is swung clear of the pin $c$.

The pins $b$ and $c$, instead of being parts of a single bar, E, may be separate pieces fitted into the handle.

The detachable handle, constructed as described, can be utilized on all kinds of sad-irons, and only one is required for a number of irons in one household.

From the ends of the handle D is suspended a semi-circular plate, G, made of sheet-metal, its ends being secured by the pins $b$ $c$ that fit through it.

Upon this plate is fastened a shield, H, made of wood, fabric, or other bad conductor of heat. This shield prevents the heat of the iron from ascending to the hand, and is a more perfect protection than any of the devices formerly in use.

Being secured to the removable handle it is more convenient and not as cumbersome as the devices formerly in use.

The metallic supporting-plate G prevents it from shrinking, and makes it substantial and reliable.

Having thus described my invention,

What I claim as new, and desire to secure by Letters Patent, is—

1. The detachable sad-iron handle D, when supported in the posts B C, that are fixed to the sad-iron, and when locked by means of a hook, $g$, formed on a pivoted plate, F, substantially as herein shown and described, to operate as set forth.

2. The slotted plate F, pivoted to one of the posts that project form a sad-iron, and arranged to lock the removable handle D, substantially as herein shown and described.

JULIE DITTRICH.

Witnesses:
 FRANK BLOCKLEY,
 ALEX. F. ROBERTS.